US012798939B2

(12) United States Patent
Toyoshima et al.

(10) Patent No.: US 12,798,939 B2
(45) Date of Patent: Nov. 17, 2026

(54) TRANSFER ROBOT, CONTROL METHOD THEREFOR, AND NON-TRANSITORY STORAGE MEDIUM

(71) Applicant: TOYOTA JIDOSHA KABUSHIKI KAISHA, Toyota (JP)

(72) Inventors: Satoshi Toyoshima, Okazaki (JP); Shiro Oda, Anjo (JP); Takeshi Matsui, Nissin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 334 days.

(21) Appl. No.: 18/586,873

(22) Filed: Feb. 26, 2024

(65) Prior Publication Data

US 2024/0343539 A1 Oct. 17, 2024

(30) Foreign Application Priority Data

Apr. 17, 2023 (JP) ................................ 2023-067123

(51) Int. Cl.

*B66F 9/06* (2006.01)
*B66F 9/075* (2006.01)
*G08B 21/18* (2006.01)

(52) U.S. Cl.

CPC ............ *B66F 9/063* (2013.01); *B66F 9/0755* (2013.01); *G08B 21/182* (2013.01)

(58) Field of Classification Search

CPC ....... B66F 9/063; B66F 9/0755; G08B 21/182
See application file for complete search history.

(56) References Cited

U.S. PATENT DOCUMENTS

| | | | | |
|---|---|---|---|---|
| 9,827,683 | B1 * | 11/2017 | Hance | B25J 19/021 |
| 2012/0191272 | A1 * | 7/2012 | Andersen | G06Q 10/087 705/28 |
| 2015/0194040 | A1 * | 7/2015 | Fiedler | H04W 4/70 340/870.09 |
| 2020/0065748 | A1 * | 2/2020 | Durkee | G06Q 30/0639 |
| 2021/0214163 | A1 * | 7/2021 | Deacon | B25J 13/08 |
| 2022/0267102 | A1 | 8/2022 | Ishida | |

FOREIGN PATENT DOCUMENTS

JP 2022-127886 A 9/2022

* cited by examiner

*Primary Examiner* — Kyle O Logan
(74) *Attorney, Agent, or Firm* — Oliff PLC

(57) ABSTRACT

A transfer robot that conveys a predetermined package loaded on a load-carrying platform includes: the load-carrying platform; a first determining device configured to determine whether an object is loaded on the load-carrying platform; a second determining device configured to determine whether the predetermined package is loaded on the load-carrying platform; and at least one of a controller configured to control the transfer robot such that the transfer robot performs a predetermined operation and a warning device configured to issue a warning, when the first determining device determines that the object is loaded on the load-carrying platform and the second determining device determines that the predetermined package is not loaded on the load-carrying platform.

8 Claims, 6 Drawing Sheets

TRANSFER ROBOT, CONTROL METHOD THEREFOR, AND NON-TRANSITORY STORAGE MEDIUM

CROSS-REFERENCE TO RELATED APPLICATION

This application claims priority to Japanese Patent Application No. 2023-067123 filed on Apr. 17, 2023, incorporated herein by reference in its entirety.

BACKGROUND

1. Technical Field

The disclosure relates to a transfer robot that conveys a predetermined package loaded on a load-carrying platform, a control method therefor, and a non-transitory storage medium.

2. Description of Related Art

There is known a transfer robot that conveys a predetermined package loaded on a load-carrying platform (see, for example, Japanese Unexamined Patent Application Publication No. 2022-127886 (JP 2022-127886 A)).

SUMMARY

Incidentally, in the transfer robot, for example, a method of checking whether the predetermined package is loaded on the load-carrying platform by using machine learning or the like is presumable; however, the method is not described. Therefore, an object (a human, a wrong package, or the like) other than the predetermined package may be loaded on the load-carrying platform and conveyed.

The disclosure provides a transfer robot, a control method therefor, and a non-transitory storage medium, which are capable of reducing conveyance of an object other than a predetermined package, loaded on a load-carrying platform.

A first aspect of the disclosure is a transfer robot that conveys a predetermined package loaded on a load-carrying platform. The transfer robot includes: the load-carrying platform; a first determining device configured to determine whether an object is loaded on the load-carrying platform; a second determining device configured to determine whether the predetermined package is loaded on the load-carrying platform; and at least one of a controller configured to control the transfer robot such that the transfer robot performs a predetermined operation and a warning device configured to issue a warning, when the first determining device determines that the object is loaded on the load-carrying platform and the second determining device determines that the predetermined package is not loaded on the load-carrying platform.

In the above aspect, (1) the load-carrying platform may have a recessed portion, and, in a state where the predetermined package is loaded at a predetermined location on the load-carrying platform, a projecting portion of the predetermined package may be inserted in the recessed portion, and the second determining device may include a second sensor configured to detect the projecting portion inserted in the recessed portion and may be configured to, when the second sensor does not detect the projecting portion, determine that the predetermined package is not loaded on the load-carrying platform; or (2) the load-carrying platform may have a projecting portion, and, in a state where the predetermined package is loaded at a predetermined location on the load-carrying platform, the projecting portion of the load-carrying platform may be inserted in a recessed portion of the predetermined package, and the second determining device may include a second sensor configured to detect the recessed portion in which the projecting portion is inserted and may be configured to, when the second sensor does not detect the recessed portion, determine that the predetermined package is not loaded on the load-carrying platform.

In the above aspect, a pattern to be detected may be provided on the load-carrying platform, and the first determining device may include a first sensor configured to recognize the pattern to be detected on the load-carrying platform and may be configured to, when the first sensor recognizes the pattern to be detected on the load-carrying platform, determine that the object is not loaded on the load-carrying platform.

In the above aspect, the transfer robot may further include a lifting and lowering device configured to lift and lower the load-carrying platform. The first determining device may be configured to determine whether the object is loaded on the load-carrying platform based on a torque used when the load-carrying platform is lifted by the lifting and lowering device.

In the above aspect, the transfer robot may further include a load sensor provided in the load-carrying platform and configured to detect a load of the object on the load-carrying platform. The second determining device may be configured to determine whether the predetermined package is loaded on the load-carrying platform based on the detected load.

In the above aspect, the transfer robot may further include a temperature sensor provided in the load-carrying platform and configured to detect a temperature of the object on the load-carrying platform. The second determining device may be configured to determine whether the predetermined package is loaded on the load-carrying platform based on the detected temperature.

In the above aspect, the controller may be configured to execute a control to perform at least one of a stop, a slowdown, and a route change of the transfer robot as the predetermined operation.

A second aspect of the disclosure is a control method for a transfer robot that conveys a predetermined package loaded on a load-carrying platform. The control method includes: determining whether an object is loaded on the load-carrying platform; determining whether the predetermined package is loaded on the load-carrying platform; and, when it is determined that the object is loaded on the load-carrying platform and it is determined that the predetermined package is not loaded on the load-carrying platform, performing at least one of controlling movement of the transfer robot and issuing a warning.

A third aspect of the disclosure is a non-transitory storage medium storing instructions executable on one or more processors and causing the one or more processors to execute functions. The functions include: determining whether an object is loaded on a load-carrying platform of a transfer robot; determining whether a predetermined package is loaded on the load-carrying platform; and, when it is determined that the object is loaded on the load-carrying platform and it is determined that the predetermined package is not loaded on the load-carrying platform, performing at least one of controlling movement of the transfer robot and issuing a warning.

According to the aspects of the disclosure, it is possible to provide a transfer robot, a control method therefor, and a non-transitory storage medium, which are capable of reducing conveyance of an object other than a predetermined package, loaded on a load-carrying platform.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

Figure 1:
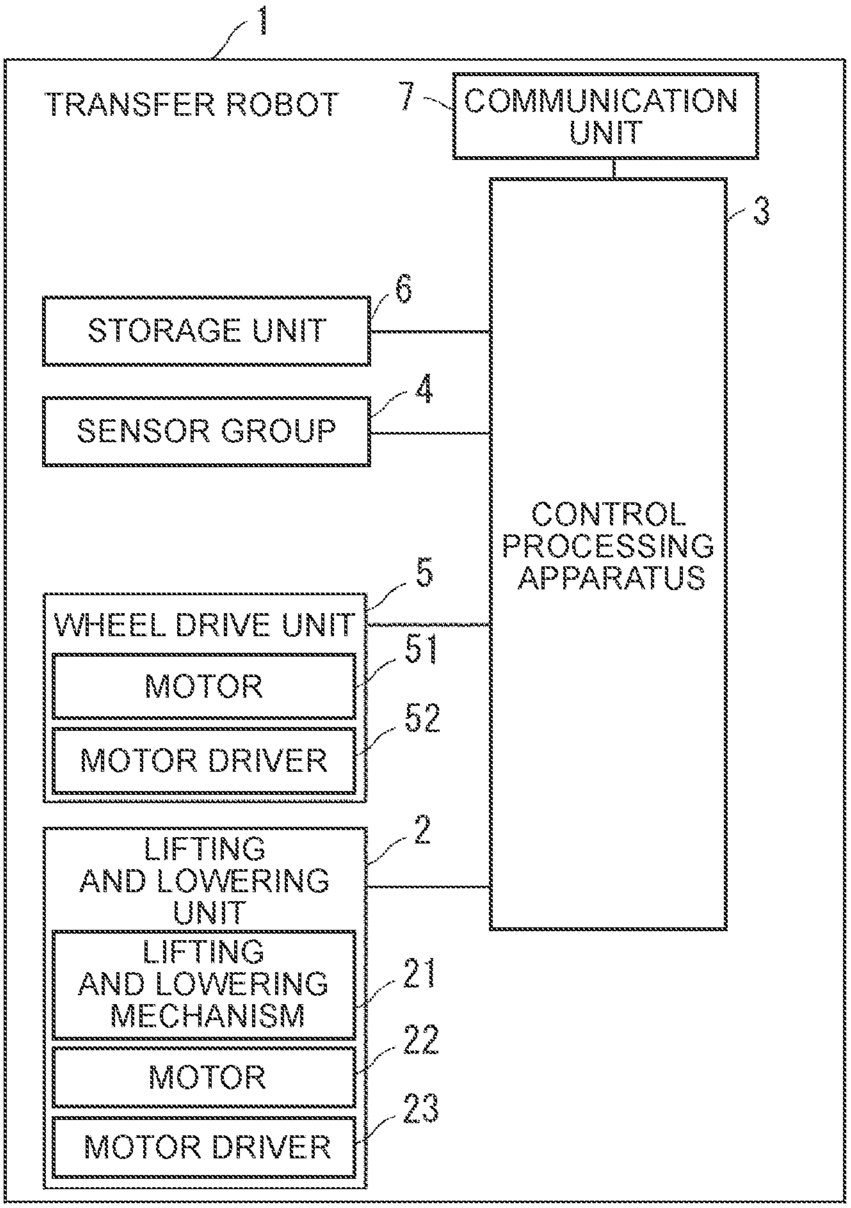
FIG. 1 is a block diagram that shows a schematic system configuration of a transfer robot according to a first embodiment.
Figure 2:
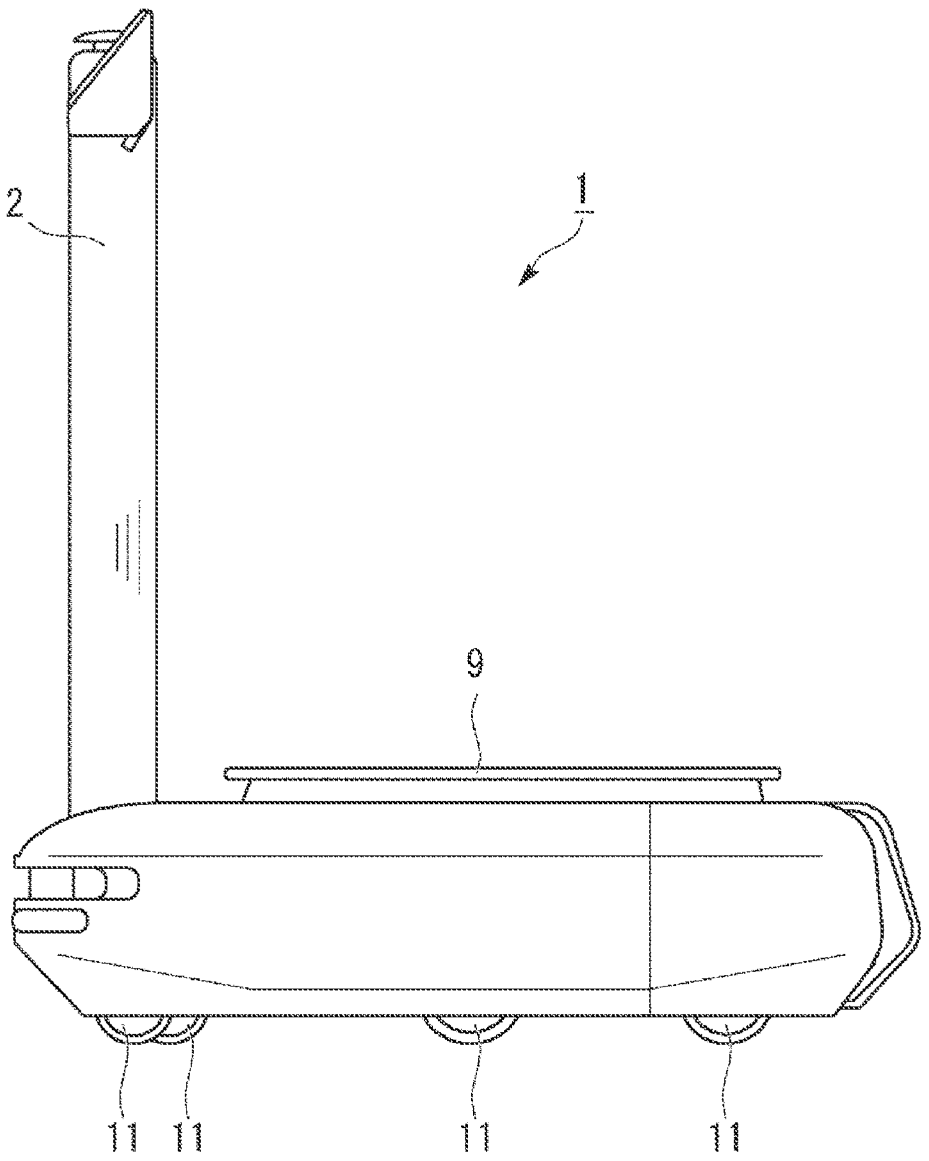
FIG. 2 is a side view that shows a schematic configuration of the transfer robot according to the embodiment.

Hereinafter, a first embodiment will be described with reference to the accompanying drawings. FIG. 1 is a block diagram that shows a schematic system configuration of a transfer robot according to the present embodiment. FIG. 2 is a side view that shows a schematic configuration of the transfer robot according to the present embodiment. The transfer robot 1 according to the present embodiment loads a predetermined package on a load-carrying platform 9 and conveys the predetermined package. The transfer robot 1 according to the present embodiment includes, for example, a lifting and lowering unit 2, a control processing apparatus 3, a sensor group 4, a wheel drive unit 5, a storage unit 6, and a communication unit 7.

The control processing apparatus 3 is an information processing apparatus including an arithmetic unit, such as a central processing unit (CPU) and a graphics processing unit (GPU). The control processing apparatus 3 acquires information from the components of the transfer robot 1 via the communication unit 7 and sends instructions to the components via the communication unit 7. The control processing apparatus 3 controls the operation of the wheel drive unit 5 and the operation of the lifting and lowering unit 2.

The sensor group 4 collectively refers to various sensors of the transfer robot 1. The sensor group 4 includes a distance sensor, an attitude sensor, a rotary encoder, and the like. The sensor group 4 is connected to the control processing apparatus 3 and supplies detected signals to the control processing apparatus 3.

The wheel drive unit 5 includes a motor 51 used to drive wheels 11, a motor driver 52 for driving the motor 51, and the like. The lifting and lowering unit 2 includes a lifting and lowering mechanism 21 used to lift and lower the load-carrying platform 9, a motor 22 used to drive the lifting and lowering mechanism 21, a motor driver 23 for driving the motor 22, and the like. The lifting and lowering mechanism 21 is made up of a ball screw or the like and is used to lift and lower the load-carrying platform 9 in an up and down direction. The lifting and lowering mechanism 21 lifts and lowers the predetermined package loaded on the load-carrying platform 9. The wheel drive unit 5 and the lifting and lowering unit 2 are connected to the control processing apparatus 3 and operate upon receiving instructions from the control processing apparatus 3.

The control processing apparatus 3 controls movement of the transfer robot 1 based on, for example, a moving route sent from a server or the like, and distance information to an obstacle, detected by the distance sensor of the sensor group 4. The control processing apparatus 3 controls the wheel drive unit 5 such that the transfer robot 1 moves in accordance with the moving route sent from the server or the like while avoiding the obstacle based on the distance information to the obstacle, detected by the distance sensor. Thus, the transfer robot 1 is capable of autonomously moving from a set departure place to a set destination while avoiding obstacles.

The storage unit 6 includes a nonvolatile memory and stores a floor map and operation parameters. The floor map is a database needed for the transfer robot 1 to autonomously move. The floor map may include location information of obstacles and articles to be conveyed.

Incidentally, with an existing transfer robot, an object (a human, a wrong package, or the like) other than a predetermined package can be loaded on the load-carrying platform and conveyed.

Figure 3:
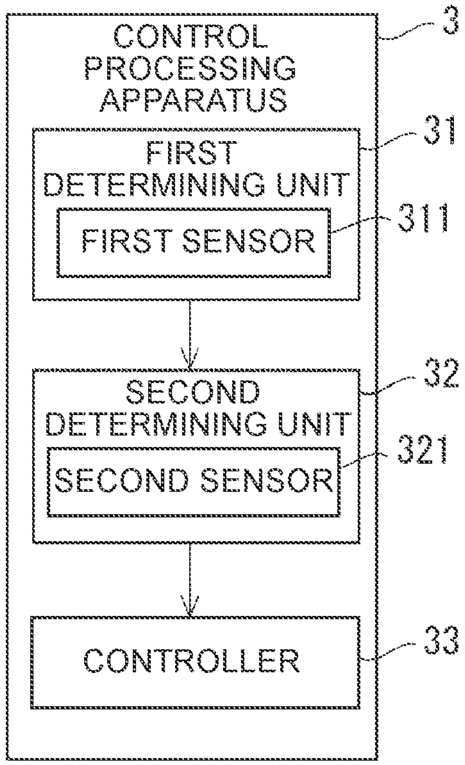
FIG. 3 is a block diagram that shows a schematic system configuration of a control processing apparatus of the transfer robot according to the embodiment.

FIG. 3 is a block diagram that shows a schematic system configuration of the control processing apparatus of the transfer robot according to the present embodiment.

As shown in FIG. 3, the control processing apparatus 3 of the transfer robot 1 according to the present embodiment includes a first determining unit 31, a second determining unit 32, and a controller 33. The first determining unit 31 determines whether an object is loaded on the load-carrying platform 9. The second determining unit 32 determines whether a predetermined package is loaded on the load-carrying platform 9. When the first determining unit 31 determines that an object is loaded on the load-carrying platform 9 and the second determining unit 32 determines that the predetermined package is not loaded on the load-carrying platform 9, the controller 33 controls the transfer robot 1 such that the transfer robot 1 performs a predetermined operation.

The first determining unit 31 determines that an object is loaded on the load-carrying platform 9. In this state, an object other than the predetermined package is possibly loaded on the load-carrying platform 9. For this reason, in the present embodiment, additionally, the second determining unit 32 determines whether the predetermined package is loaded on the load-carrying platform 9. Thus, it is possible to confirm that the object loaded on the load-carrying platform 9 is the predetermined package with no doubt.

Furthermore, when the second determining unit 32 determines that the predetermined package is not loaded on the load-carrying platform 9, the controller 33 according to the present embodiment determines that the predetermined package is not loaded on the load-carrying platform 9 and an object other than the predetermined package is loaded on the load-carrying platform 9. Then, the controller 33 controls the transfer robot 1 such that the transfer robot 1 does not perform usual conveyance and the transfer robot 1 performs a predetermined operation, such as a stop and a slowdown. Thus, it is possible to reduce conveyance of an object other than the predetermined package, loaded on the load-carrying platform 9.

When the second determining unit 32 determines that the predetermined package is not loaded on the load-carrying platform 9, the controller 33 may make a route change to a special place without using a route to a usual place. For example, the controller 33 may make a route change to a place where further precise check is possible due to an area where a surveyor is present, an external camera, or the like, without taking a route to a pick-up place of the transfer robot 1. Thus, it is possible to further precisely check that an object other than the predetermined package is loaded on the load-carrying platform 9, in an area where the surveyor is present or with an external camera or the like.

When the second determining unit 32 determines that the predetermined package is not loaded on the load-carrying platform 9, the controller 33 may selectively control a combination of a stop, a slowdown, and a route change of the transfer robot 1.

The first determining unit 31 is a specific example of a first determining device. The first determining unit 31 determines whether an object is loaded on the load-carrying platform 9.

The first determining unit 31 includes a first sensor 311 that acquires a pattern to be detected on the load-carrying platform 9. The first sensor 311 is, for example, a camera, a light detection and ranging (Lidar), or the like. The first sensor 311 is, for example, provided near an upper end of a supporting portion extending upward, so as to look down a top surface of the load-carrying platform 9. The first sensor 311 may be provided in infrastructure, equipment, or the like.

For example, a pattern to be detected, such as a marker and a protrusion pattern, is provided on the top surface and at the center of the load-carrying platform 9. When the first determining unit 31 recognizes and acquires the pattern to be detected on the load-carrying platform 9 based on an image or the like acquired by the first sensor 311, the first determining unit 31 determines that an object is not loaded on the load-carrying platform 9.

On the other hand, when the first determining unit 31 does not recognize or acquire the pattern to be detected on the load-carrying platform 9 based on an image or the like acquired by the first sensor 311, the first determining unit 31 determines that an object is loaded on the load-carrying platform 9.

The first determining unit 31 may determine whether an object is loaded on the load-carrying platform 9, based on the torque of the motor 22 of the lifting and lowering mechanism 21 used when the load-carrying platform 9 is lifted by the lifting and lowering unit 2. The first determining unit 31 outputs the determination result to the second determining unit 32.

The second determining unit 32 is a specific example of a second determining device. The second determining unit 32 determines whether the predetermined package is loaded on the load-carrying platform 9.

Figure 4:
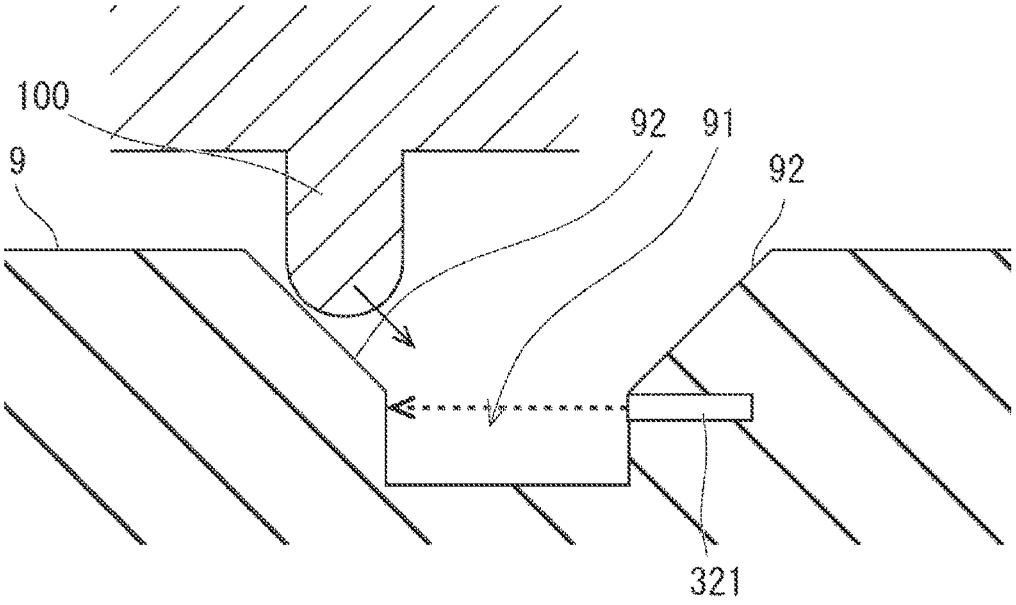
FIG. 4 is a view that shows a recessed portion formed on a top surface and at a center of a load-carrying platform.

For example, as shown in FIG. 4, a recessed portion 91 is formed on the top surface and at the center of the load-carrying platform 9. On the other hand, a projecting portion 100 is provided on the undersurface of the predetermined package in correspondence with the recessed portion 91 of the load-carrying platform 9. In a state where the predetermined package is loaded at a predetermined location on the load-carrying platform 9, the projecting portion 100 of the predetermined package is inserted in the recessed portion 91. At this time, a tapered portion 92 may be formed near the entrance of the recessed portion 91. Thus, the projecting portion 100 of the predetermined package is smoothly inserted into the recessed portion 91 along the inclined surface of the tapered portion 92.

The second determining unit 32 includes a second sensor 321. The second sensor 321 is provided in the recessed portion 91 and detects the projecting portion 100 of the predetermined package, inserted in the recessed portion 91. The second sensor 321 is, for example, an optical fiber sensor, a light-emitting diode (LED) sensor, a switch sensor, or the like. When the second sensor 321 does not detect the projecting portion 100, the second determining unit 32 determines that the predetermined package is not loaded on the load-carrying platform 9.

A projecting portion may be formed on the top surface and at the center of the load-carrying platform 9. On the other hand, a recessed portion may be provided on the undersurface of the predetermined package in correspondence with the projecting portion of the load-carrying platform 9. In a state where the predetermined package is loaded on the load-carrying platform 9 at the predetermined location, the projecting portion is inserted into the recessed portion. The second determining unit 32 may include a second sensor. The second sensor is provided in the projecting portion and detects the recessed portion in which the projecting portion is inserted. When the second sensor does not detect the recessed portion, the second determining unit 32 determines that the predetermined package is not loaded on the load-carrying platform 9.

For example, a staff or the like may check that the predetermined package is loaded on the load-carrying platform 9 and input the information to the second determining unit 32. The second determining unit 32 may determine whether the predetermined package is loaded on the load-carrying platform 9, based on the input information.

A load sensor may be provided in the load-carrying platform 9. The load sensor detects the load of an object on the load-carrying platform 9. When the weight of the predetermined package is known in advance, the second determining unit 32 may determine whether the predetermined package is loaded on the load-carrying platform 9, based on the load of an object on the load-carrying platform 9, detected by the load sensor.

Furthermore, a temperature sensor may be provided in the load-carrying platform 9. The temperature sensor detects the temperature of an object on the load-carrying platform 9. To increase the determination accuracy, the second determining unit 32 may determine whether the predetermined package is loaded on the load-carrying platform 9, based on the temperature of an object, detected by the temperature sensor, in combination with the above-described determination.

When, for example, the temperature of an object, detected by the temperature sensor, is higher than or equal to a predetermined temperature, the second determining unit 32 determines that an animal, such as a cat, is loaded and determines that the predetermined package is not loaded on the load-carrying platform 9. The second determining unit 32 may determine whether the predetermined package is loaded on the load-carrying platform 9, by determining the size of a human, such as a child, based on the temperature of an object, detected by the temperature sensor. As described above, the second determining unit 32 determines whether the predetermined package is loaded on the load-carrying platform 9 and outputs the determination result to the controller 33.

The controller 33 is a specific example of a controller. When the first determining unit 31 determines that an object is loaded on the load-carrying platform 9 and the second determining unit 32 determines that the predetermined package is not loaded on the load-carrying platform 9, the controller 33 controls the transfer robot 1 such that the transfer robot 1 performs a predetermined operation. The controller 33 executes a control to perform at least one of a stop, a slowdown, and a route change of the transfer robot 1 as the predetermined operation. Thus, it is possible to reduce conveyance of an object other than the predetermined package, loaded on the load-carrying platform 9.

Figure 5:
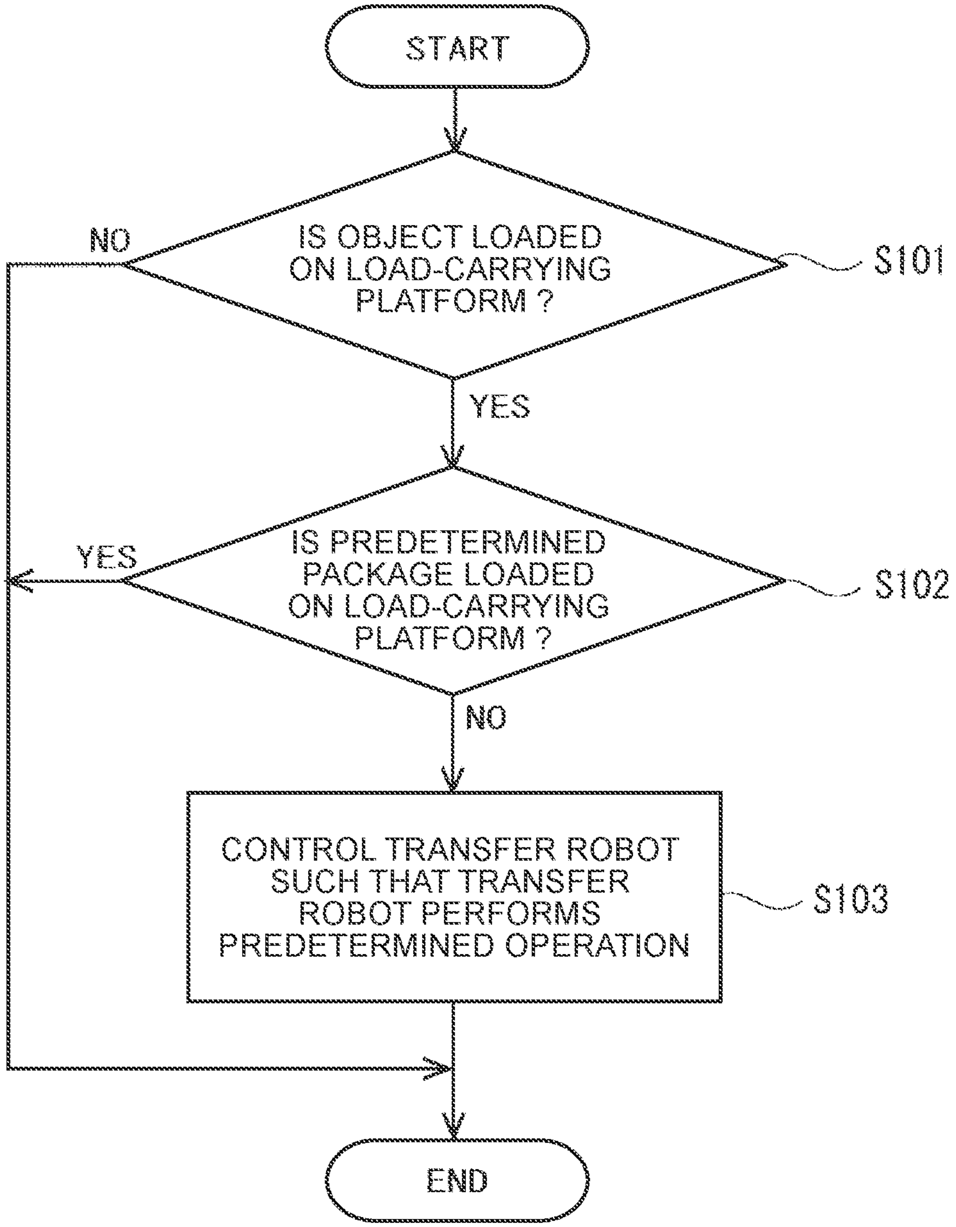
FIG. 5 is a flowchart that shows the flow of a control method for the transfer robot according to the embodiment.

Next, a control method for the transfer robot according to the present embodiment will be described. FIG. 5 is a flowchart that shows the flow of a control method for the transfer robot according to the present embodiment.

The first determining unit 31 determines whether an object is loaded on the load-carrying platform 9 (step S101). When the first determining unit 31 determines that an object is loaded on the load-carrying platform 9 (YES in step S101), the second determining unit 32 determines whether the predetermined package is loaded on the load-carrying platform 9 (step S102). On the other hand, when the first determining unit 31 determines that an object is not loaded on the load-carrying platform 9 (NO in step S101), the process ends.

When the second determining unit 32 determines that the predetermined package is loaded on the load-carrying platform 9 (YES in step S102), the process ends. On the other hand, when the second determining unit 32 determines that the predetermined package is not loaded on the load-carrying platform 9 (NO in step S102), the controller 33 controls the transfer robot 1 such that the transfer robot 1 performs the predetermined operation (step S103).

As described above, the transfer robot 1 according to the present embodiment includes the first determining unit 31, the second determining unit 32, and the controller 33. The first determining unit 31 determines whether an object is loaded on the load-carrying platform 9. The second determining unit 32 determines whether the predetermined package is loaded on the load-carrying platform 9. When the first determining unit 31 determines that an object is loaded on the load-carrying platform 9 and the second determining unit 32 determines that the predetermined package is not loaded on the load-carrying platform 9, the controller 33 controls the transfer robot 1 such that the transfer robot 1 performs the predetermined operation.

With the transfer robot 1 according to the present embodiment, after the first determining unit 31 determines that an object is loaded on the load-carrying platform 9, the second determining unit 32 determines whether the predetermined package is loaded on the load-carrying platform 9. Thus, it is possible to confirm that the object loaded on the load-carrying platform 9 is the predetermined package with no doubt. Furthermore, when the second determining unit 32 determines that the predetermined package is not loaded on the load-carrying platform 9, the controller 33 according to the present embodiment controls the transfer robot 1 such that the transfer robot 1 performs the predetermined operation without performing usual conveyance. Thus, it is possible to reduce conveyance of an object other than the predetermined package, loaded on the load-carrying platform 9.

Second Embodiment

Figure 6:
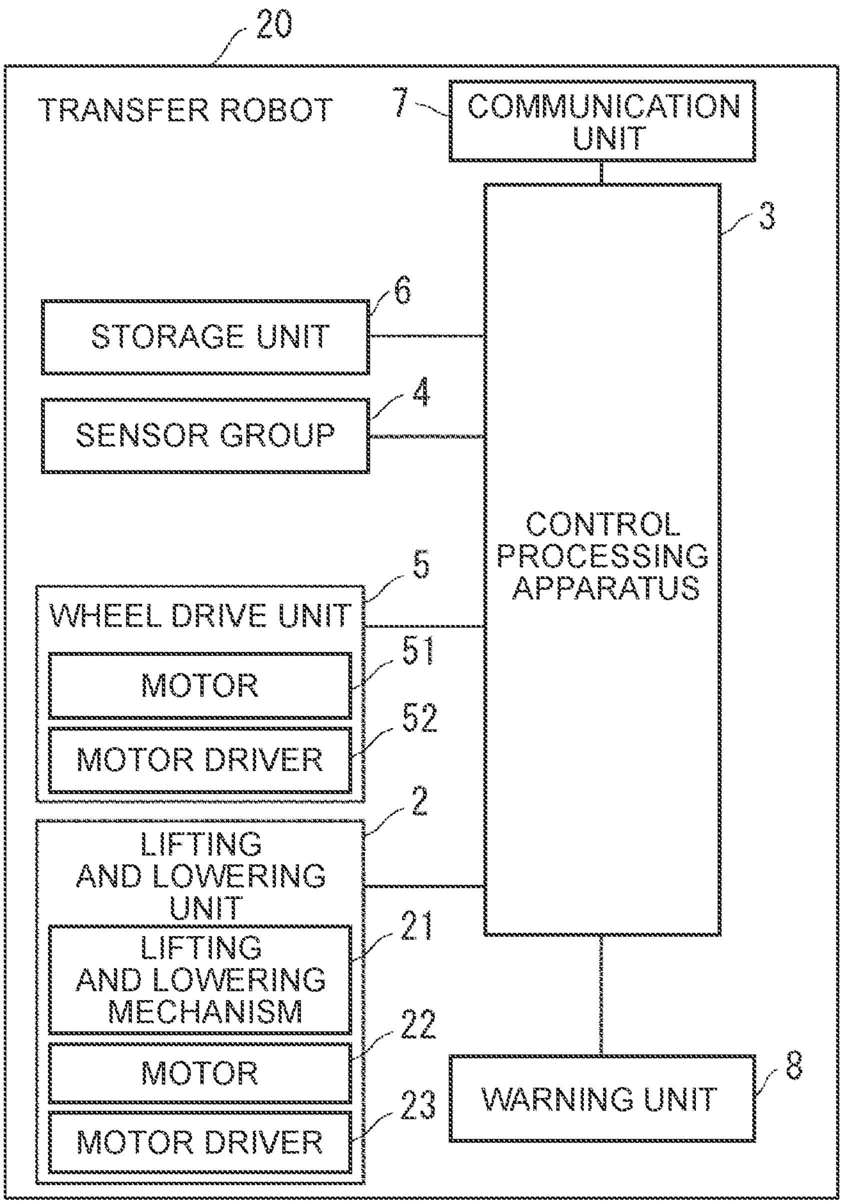
FIG. 6 is a block diagram that shows a schematic system configuration of a transfer robot according to a second embodiment.

FIG. 6 is a block diagram that shows a schematic system configuration of a transfer robot according to a second embodiment. The transfer robot 20 according to the present embodiment further includes a warning unit 8 that issues a warning to a user. The warning unit 8 is a specific example of a warning device.

When the first determining unit 31 determines that an object is loaded on the load-carrying platform 9 and the second determining unit 32 determines that the predetermined package is not loaded on the load-carrying platform 9, the warning unit 8 issues a warning. Thus, it is possible to inform the user that an object other than the predetermined package is loaded on the load-carrying platform 9, so it is possible to reduce conveyance of an object other than the predetermined package, loaded on the load-carrying platform 9.

The warning unit 8 issues a warning to the user by using, for example, a display device, such as a liquid crystal display, a voice output device, such as a speaker, a lighting device, such as an LED warning lamp, the communication unit 7, or the like.

More specifically, the warning unit 8 causes the display device to show that "an object other than the predetermined package is loaded on the load-carrying platform 9" or causes the voice output device to output that "an object other than the predetermined package is loaded on the load-carrying platform 9". The warning unit 8 turns on or blinks the lighting device or sends a signal or message for informing that "an object other than the predetermined package is loaded on the load-carrying platform 9" to a management system, an information terminal of the user, or the like via the communication unit 7.

When the first determining unit 31 determines that an object is loaded on the load-carrying platform 9 and the second determining unit 32 determines that the predetermined package is not loaded on the load-carrying platform 9, the warning unit 8 may issue the warning or the controller 33 may control the transfer robot 20 such that the transfer robot 20 performs the predetermined operation. Thus, it is possible to further reliably reduce conveyance of an object other than the predetermined package, loaded on the load-carrying platform 9.

Some embodiments of the disclosure are described. The embodiments are only provided for illustrative purposes and are not intended to limit the scope of the disclosure. The new embodiments may be implemented in other various modes and may be variously omitted, replaced, or changed without departing from the purport of the disclosure. The embodiments and their modifications fall within the scope and purport of the disclosure and also fall within the scope of the disclosure recited in the appended claims and equivalents thereof.

The disclosure can implement the processes shown in FIG. 5 by causing a processor to run a computer program.

A program can be stored in various types of non-transitory computer-readable media and can be supplied to a computer. The non-transitory computer-readable media include various types of tangible storage media. Examples of the non-transitory computer-readable media include a magnetic recording medium (such as a flexible disk, a magnetic tape, and a hard disk drive), a magneto-optical recording medium (such as a magneto-optical disk), a CD-read only memory (ROM), a CD-R, a CD-R/W, a semiconductor memory (such as a mask ROM, a programmable ROM (PROM), an erasable PROM (EPROM), a flash ROM, and a random access memory (RAM)).

The program may be supplied to a computer via various types of transitory computer-readable media. Examples of the transitory computer-readable media include an electrical signal, an optical signal, and an electromagnetic wave.

Transitory computer-readable media are capable of supplying the program to a computer via a wired communication path, such as an electric wire and an optical fiber, or a wireless communication path.

Not only various units that make up the control processing apparatus 3 according to the above-described embodiments are implemented by a program, but also some or all of the various units may be implemented by dedicated hardware, such as an application specific integrated circuit (ASIC) and a field-programmable gate array (FPGA).

What is claimed is:

1. A transfer robot that conveys a predetermined package loaded on a load-carrying platform, the transfer robot comprising:

the load-carrying platform;

a first determining device configured to determine whether an object is loaded on the load-carrying platform;

a second determining device configured to determine whether the predetermined package is loaded on the load-carrying platform, wherein:

(1) the load-carrying platform has a recessed portion, and, in a state where the predetermined package is loaded at a predetermined location on the load-carrying platform, a projecting portion of the predetermined package is inserted in the recessed portion, and the second determining device includes a second sensor configured to detect the projecting portion inserted in the recessed portion and is configured to, when the second sensor does not detect the projecting portion, determine that the predetermined package is not loaded on the load-carrying platform; or (2) the load-carrying platform has a projecting portion, and, in a state where the predetermined package is loaded at a predetermined location on the load-carrying platform, the projecting portion of the load-carrying platform is inserted in a recessed portion of the predetermined package, and the second determining device includes a second sensor configured to detect the recessed portion in which the projecting portion is inserted and is configured to, when the second sensor does not detect the recessed portion, determine that the predetermined package is not loaded on the load-carrying platform; and at least one of a controller configured to control the transfer robot such that the transfer robot performs a predetermined operation and a warning device configured to issue a warning, when the first determining device determines that the object is loaded on the load-carrying platform and the second determining device determines that the predetermined package is not loaded on the load-carrying platform.

2. The transfer robot according to claim 1, wherein:

a pattern to be detected is provided on the load-carrying platform; and the first determining device includes a first sensor configured to recognize the pattern to be detected on the load-carrying platform and is configured to, when the first sensor recognizes the pattern to be detected on the load-carrying platform, determine that the object is not loaded on the load-carrying platform.

3. The transfer robot according to claim 1, further comprising a lifting and lowering device configured to lift and lower the load-carrying platform, wherein the first determining device is configured to determine whether the object is loaded on the load-carrying platform based on a torque used when the load-carrying platform is lifted by the lifting and lowering device.

4. The transfer robot according to claim 1, further comprising a load sensor provided in the load-carrying platform and configured to detect a load of the object on the load-carrying platform, wherein the second determining device is configured to determine whether the predetermined package is loaded on the load-carrying platform based on the detected load.

5. The transfer robot according to claim 1, further comprising a temperature sensor provided in the load-carrying platform and configured to detect a temperature of the object on the load-carrying platform, wherein the second determining device is configured to determine whether the predetermined package is loaded on the load-carrying platform based on the detected temperature.

6. The transfer robot according to claim 1, wherein the controller is configured to execute a control to perform at least one of a stop, a slowdown, and a route change of the transfer robot as the predetermined operation.

7. A transfer robot that conveys a predetermined package loaded on a load-carrying platform, the transfer robot comprising:

the load-carrying platform, wherein a pattern to be detected is provided on the load-carrying platform;

a first determining device configured to determine whether an object is loaded on the load-carrying platform, wherein the first determining device includes a first sensor configured to recognize the pattern to be detected on the load-carrying platform and is configured to, when the first sensor recognizes the pattern to be detected on the load-carrying platform, determine that the object is not loaded on the load-carrying platform;

a second determining device configured to determine whether the predetermined package is loaded on the load-carrying platform; and at least one of a controller configured to control the transfer robot such that the transfer robot performs a predetermined operation and a warning device configured to issue a warning, when the first determining device determines that the object is loaded on the load-carrying platform and the second determining device determines that the predetermined package is not loaded on the load-carrying platform.

8. A transfer robot that conveys a predetermined package loaded on a load-carrying platform, the transfer robot comprising:

the load-carrying platform;

a lifting and lowering device configured to lift and lower the load-carrying platform;

a first determining device configured to determine whether an object is loaded on the load-carrying platform, wherein the first determining device is configured to determine whether the object is loaded on the load-carrying platform based on a torque used when the load-carrying platform is lifted by the lifting and lowering device;

a second determining device configured to determine whether the predetermined package is loaded on the load-carrying platform; and at least one of a controller configured to control the transfer robot such that the transfer robot performs a predetermined operation and a warning device configured to issue a warning, when the first determining device determines that the object is loaded on the load-carrying platform and the second determining device determines that the predetermined package is not loaded on the load-carrying platform.

* * * * *